(12) United States Patent
Carru et al.

(10) Patent No.: US 12,407,732 B2
(45) Date of Patent: *Sep. 2, 2025

(54) FIRST CLASS DATABASE OBJECT SERVER APPLICATION

(71) Applicant: Snowflake Inc., Bozeman, MT (US)

(72) Inventors: Damien Carru, New York, NY (US); Jeremy Yujui Chen, Newark, CA (US); Timothy S. Conkling, San Francisco, CA (US); Thierry Cruanes, San Mateo, CA (US); Benoit Dageville, San Mateo, CA (US); Unmesh Jagtap, San Mateo, CA (US); William A. Pugh, Seattle, WA (US); Shrikant Ravindra Shanbhag, Mountain View, CA (US); Xu Xu, Campbell, CA (US)

(73) Assignee: Snowflake Inc., Bozeman, MT (US)

( * ) Notice: Subject to any disclaimer, the term of this patent is extended or adjusted under 35 U.S.C. 154(b) by 171 days.

This patent is subject to a terminal disclaimer.

(21) Appl. No.: 18/353,445

(22) Filed: Jul. 17, 2023

(65) Prior Publication Data

US 2023/0412647 A1    Dec. 21, 2023

Related U.S. Application Data

(63) Continuation of application No. 17/934,899, filed on Sep. 23, 2022, now Pat. No. 11,750,661.
(Continued)

(51) Int. Cl.
*H04L 9/40* (2022.01)
*G06F 16/955* (2019.01)

(52) U.S. Cl.
CPC ............ *H04L 63/20* (2013.01); *G06F 16/955* (2019.01); *H04L 63/102* (2013.01)

(58) Field of Classification Search
CPC ...... H04L 63/20; H04L 63/102; G06F 16/955
(Continued)

(56) References Cited

U.S. PATENT DOCUMENTS 7,555,497 B2    6/2009    Thompson et al.
7,698,398 B1    4/2010    Lai
(Continued)

FOREIGN PATENT DOCUMENTS

CN    117235338    12/2023
CN    117235339    12/2023
(Continued)

OTHER PUBLICATIONS

Drucker et al., 2017 IEEE, "Faster Secure Cloud Computations with a Trusted Proxy", pp. 61-67 (Year: 2017).*
(Continued)

*Primary Examiner* — Khalil Naghdali
(74) *Attorney, Agent, or Firm* — Schwegman Lundberg & Woessner, P.A.

(57) ABSTRACT

A data platform for managing an application as a first-class database object. The data platform includes at least one processor and a memory storing instructions that cause the at least one processor to perform operations including detecting a data request from a browser for a data object located on the data platform, executing a stored procedure, the stored procedure containing instructions that cause the at least one processor to perform additional operations including instantiating a User Defined Function (UDF) server, an application engine, and the application within a security context of the data platform based on a security policy determined by an owner of the data object. The data platform then communicates with the browser using the application engine as a proxy server.

30 Claims, 8 Drawing Sheets

Related U.S. Application Data

(60) Provisional application No. 63/366,272, filed on Jun. 13, 2022.

(58) Field of Classification Search
USPC .......................................................... 713/189
See application file for complete search history.

(56) References Cited

U.S. PATENT DOCUMENTS

| | | |
|---|---|---|
| 7,921,299 B1 | 4/2011 | Anantha et al. |
| 9,460,474 B2 | 10/2016 | Grignon |
| 9,712,542 B1 | 7/2017 | Brandwine |
| 9,774,586 B1 | 9/2017 | Roche et al. |
| 11,055,390 B1 | 7/2021 | Kragh |
| 11,093,634 B1 | 8/2021 | Szuflita et al. |
| 11,146,564 B1 | 10/2021 | Ankam et al. |
| 11,256,606 B2 | 2/2022 | Wunderlich et al. |
| 11,461,080 B1 | 10/2022 | Brossard et al. |
| 11,461,322 B1 | 10/2022 | Plenderleith |
| 11,494,493 B1 | 11/2022 | Baird |
| 11,520,920 B1 | 12/2022 | Carru et al. |
| 11,552,948 B1 | 1/2023 | Peterson et al. |
| 11,750,661 B1 | 9/2023 | Carru et al. |
| 12,010,147 B2 | 6/2024 | Chen et al. |
| 2004/0054630 A1 | 3/2004 | Ginter et al. |
| 2006/0080257 A1 | 4/2006 | Vaughan et al. |
| 2007/0157203 A1 | 7/2007 | Lim |
| 2008/0184330 A1 | 7/2008 | Lal et al. |
| 2010/0299738 A1 | 11/2010 | Wahl |
| 2011/0265010 A1 | 10/2011 | Ferguson et al. |
| 2012/0096521 A1 | 4/2012 | Peddada |
| 2014/0143830 A1 | 5/2014 | Lim |
| 2014/0173702 A1 | 6/2014 | Wong et al. |
| 2016/0104005 A1 | 4/2016 | Toussaint et al. |
| 2016/0255089 A1 | 9/2016 | Diestler et al. |
| 2017/0249475 A1 | 8/2017 | Schneider et al. |
| 2017/0308377 A1 | 10/2017 | Tucker et al. |
| 2017/0322992 A1 | 11/2017 | Joseph et al. |
| 2018/0007155 A1 | 1/2018 | Saito |
| 2019/0238467 A1 | 8/2019 | Guan et al. |
| 2019/0318100 A1 | 10/2019 | Bhatia et al. |
| 2019/0372783 A1 | 12/2019 | Martinez et al. |
| 2020/0380153 A1 | 12/2020 | Mi et al. |
| 2021/0166573 A1 | 6/2021 | Douglas et al. |
| 2021/0173701 A1 | 6/2021 | Cheng et al. |
| 2021/0342196 A1 | 11/2021 | Natarajan et al. |
| 2022/0272117 A1 | 8/2022 | Maheve et al. |
| 2022/0345483 A1 | 10/2022 | Shua |
| 2022/0358233 A1 | 11/2022 | Thakur et al. |
| 2022/0407889 A1 | 12/2022 | Narigapalli et al. |
| 2023/0403306 A1 | 12/2023 | Chen et al. |
| 2024/0163316 A1 | 5/2024 | Chen et al. |

FOREIGN PATENT DOCUMENTS

| | | |
|---|---|---|
| DE | 202023103214 | 9/2023 |
| DE | 202023103216 | 9/2023 |
| JP | 2005284353 | 10/2005 |

OTHER PUBLICATIONS

Drucker et al., 2017 IEEE Computer Society, "Faster Secure Cloud Computations with a Trusted Proxy", pp. 61-67 (Year: 2017).*

U.S. Appl. No. 18/423,012, filed Jan. 25, 2024, Data Platform With Unified Privileges.

"European Application Serial No. 23178771.4, Extended European Search Report mailed Oct. 26, 2023", 10 pgs.

"European Application Serial No. 23178797.9, Extended European Search Report mailed Oct. 31, 2023", 9 pgs.

"U.S. Appl. No. 18/053,956, Notice of Allowance mailed Nov. 29, 2023", 9 pgs.

"U.S. Appl. No. 18/104,275, Preliminary Amendment filed Feb. 2, 2023", 9 pgs.

"U.S. Appl. No. 18/060,476, Non Final Office Action mailed Feb. 28, 2023", 21 pgs.

"U.S. Appl. No. 18/053,956, Notice of Allowance mailed Mar. 3, 2023", 9 pgs.

"U.S. Appl. No. 18/053,956, Supplemental Notice of Allowability mailed Mar. 29, 2023", 2 pgs.

"U.S. Appl. No. 17/934,899, Notice of Allowance mailed Apr. 17, 2023", 11 pgs.

"U.S. Appl. No. 18/104,275, Non Final Office Action mailed May 10, 2023", 23 pgs.

"U.S. Appl. No. 18/060,476, Response filed May 30, 2023 to Non Final Office Action mailed Feb. 28, 2023", 15 pgs.

"U.S. Appl. No. 18/053,956, Notice of Allowance mailed Jul. 6, 2023", 10 pgs.

"U.S. Appl. No. 18/060,476, Notice of Allowance mailed Jul. 7, 2023", 19 pgs.

"U.S. Appl. No. 17/934,899, 312 Amendment filed Jul. 17, 2023", 8 pgs.

"U.S. Appl. No. 17/934,899, PTO Response to Rule 312 Communication mailed Aug. 7, 2023", 2 pgs.

"U.S. Appl. No. 18/053,956, Notice of Allowance mailed Sep. 14, 2023", 9 pgs.

Saiz-Laudo, "Egeon: Software-Defined Data Protection for Object Storage", IEEE 22nd International Symposium on Cluster, Cloud and Internet Computing (CCGrid), 99-108.

"U.S. Appl. No. 18/053,956, Supplemental Notice of Allowability mailed May 2, 2024", 2 pgs.

"European Application Serial No. 23178797.9, Response filed Jun. 20, 2024 to Extended European Search Report mailed Oct. 31, 2023", 10 pgs.

"European Application Serial No. 23178771.4, Response filed Jun. 20, 2024 to Extended European Search Report mailed Oct. 26, 2023", 11 pgs.

"U.S. Appl. No. 18/423,012, Non Final Office Action mailed Oct. 10, 2024", 8 pgs.

"U.S. Appl. No. 18/423,012, Response filed Jan. 9, 2025 to Non Final Office Action mailed Oct. 10, 2024", 9 pgs.

* cited by examiner

FIRST CLASS DATABASE OBJECT SERVER APPLICATION

PRIORITY CLAIM

This application is a Continuation of U.S. patent application Ser. No. 17/934,899, filed Sep. 23, 2022, which claims the benefit of priority to U.S. Provisional Patent Application Ser. No. 63/366,272, filed Jun. 13, 2022, the contents of which are incorporated herein by reference in their entireties.

TECHNICAL FIELD

Examples of the disclosure relate generally to databases and, more specifically, to accessing data in a database over a network.

BACKGROUND

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

Providers of the data on a data platform may want to make the data available on the data platform to consumers of the data through a secure channel on a public network. Therefore, it would be desirable to access a database in a manner that provides high functionality in a secure manner.

BRIEF DESCRIPTION OF THE DRAWINGS

The present disclosure will be understood more fully from the detailed description given below and from the accompanying drawings of various examples of the disclosure.

DETAILED DESCRIPTION

Figure 1:
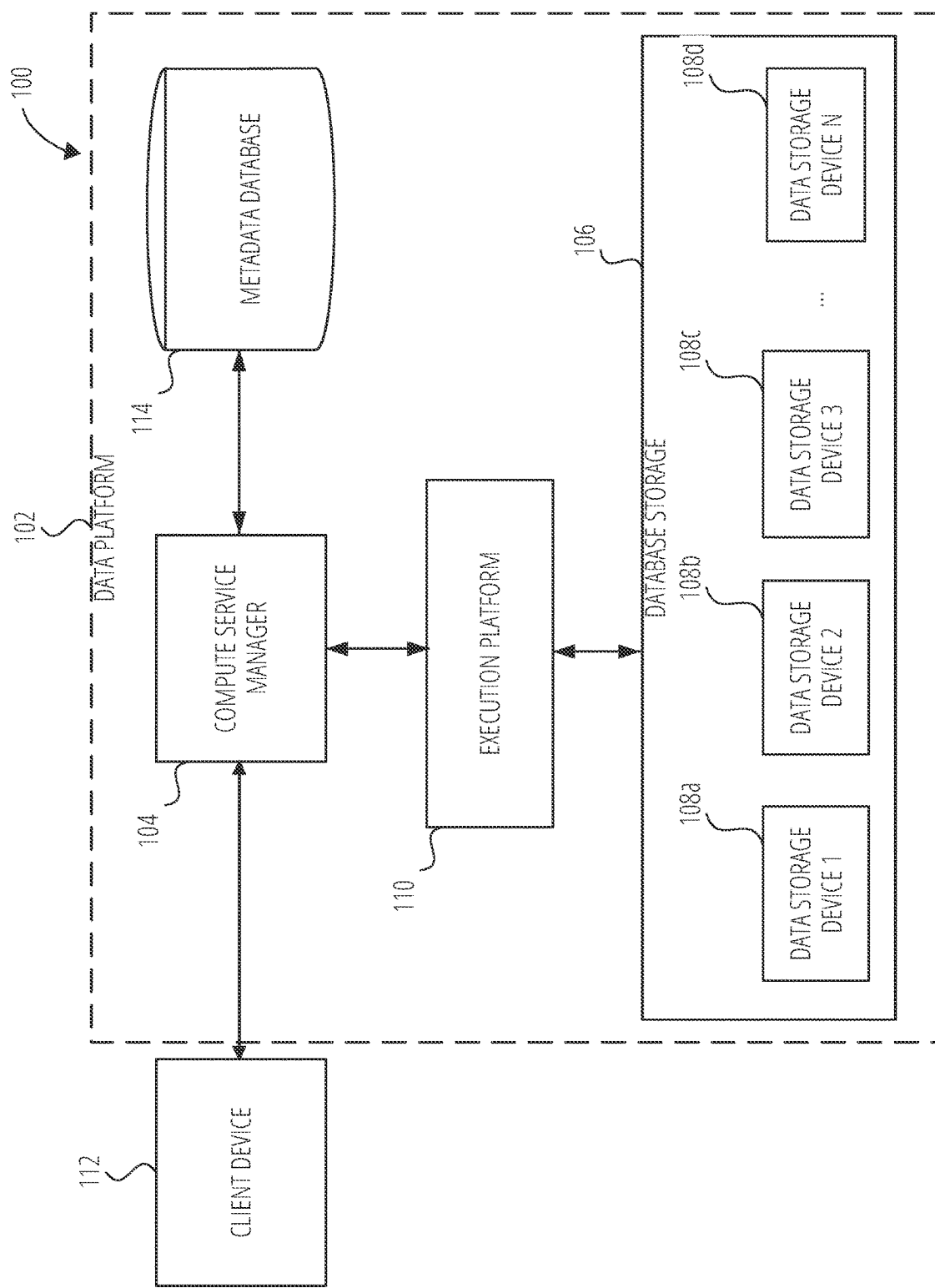
FIG. 1 illustrates an example computing environment that includes a network-based data platform in communication with a cloud storage provider system, in accordance with some examples of the present disclosure.

Current solutions for building web applications over data include dashboard tools to bespoke custom applications written with a traditional middle tier. These solutions have multiple shortcomings including: 1) They require data to leave the database security boundary, because the application lives outside the security boundary; and 2) they require additional operations and resources to manage the middle tier application servers. One solution runs a simple middle tier, at which point the cost of managing the middle tier is significantly more difficult than developing it. Another alternative approach solves the problem of eliminating a middle tier management, but does not provide a platform that users can build UI applications on. This approach is only useful for data exploration and sharing work products.

In some examples, a framework is provided having simple and easy interactions in addition to richer User Interface (UI) controls enabling users to build applications. The framework improves on traditional application development environments by providing a way to tie a security boundary of an application UI to a security boundary of data. In addition, there is no additional operational or management cost for running the applications as they are run within an existing environment and managed like any other workload.

In some examples, User Defined Function (UDF) server objects are created in a database, so they use the same permissions to be able to run them as other first-class objects within the database. They run in a security boundary the same as other stored procedures having owners' rights, so the permissions can be locked down to the role of the owner. An owner can set the permissions on the UDF server object itself, defining who can use it, as well as setting a different role for running it. When a server object is created, it becomes associated with a URL that can be hit by a Web Browser. When, the URL is hit, the system: 1) verifies their permissions against the UDF server object that is created; and 2) launches a special stored procedure that runs for an extended period of time in the security context that was configured on the UDF server; 3) the stored procedure creates a UDF Server that can securely run scripts in a locked down environment and a communication channel providing secure communications to the UDF server; and 4) The UDF Server runs a user defined web application using the communication channel to proxy communications from the browser to the web application in a low-latency and efficient way.

In some examples, a data platform for managing an application as a first-class database object includes at least one processor and a memory storing instructions that cause the at least one processor to perform operations including: detecting a data request from a browser for a data object located on the data platform; executing a stored procedure, the stored procedure containing instructions that cause the at least one processor to perform additional operations including: instantiating a User Defined Function (UDF) server, an application engine, and the application within a security context of the data platform based on a security policy determined by an owner of the data object. The data platform then communicates with the browser using the application engine as a proxy server.

In some examples, the stored procedure comprises the application engine.

In some examples, the browser includes an application browser runtime component for communicating with the application.

In some examples, the security policy includes a security manager policy.

In some examples, the instructions cause at least one processor to perform operations including receiving a request from the browser for access to the data object, verifying the request based on defined security policies and executing instructions in a sandbox process to restrict access beyond what the data object is permitted to access.

Other technical features may be readily apparent to one skilled in the art from the following figures, descriptions, and claims.

The data platform may also include where the instructions that cause the at least one processor to perform operations of instantiating a User Defined Function (UDF) server within a security context of the data platform further cause the at least one processor to perform operations includes verifying, by a security manager, the UDF server based on the security manager policy. Other technical features may be readily apparent to one skilled in the art from the following figures, descriptions, and claims.

Reference will now be made in detail to specific examples for carrying out the inventive subject matter. Examples of these specific examples are illustrated in the accompanying drawings, and specific details are set forth in the following description in order to provide a thorough understanding of the subject matter. It will be understood that these examples are not intended to limit the scope of the claims to the illustrated examples. On the contrary, they are intended to cover such alternatives, modifications, and equivalents as may be included within the scope of the disclosure.

FIG. 1 illustrates an example computing environment 100 that includes a data platform 102 in communication with a client device 112, in accordance with some examples of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the data platform 102 comprises a database storage 106, a compute service manager 104, an execution platform 110, and a metadata database 114. The database storage 106 comprises a plurality of computing machines and provides on-demand computer system resources such as data storage and computing power to the data platform 102. As shown, the database storage 106 comprises multiple data storage devices, namely data storage device 1 108a to data storage device N 108d. In some examples, the data storage devices 1 to N are cloud-based storage devices located in one or more geographic locations. For example, the data storage devices 1 to N may be part of a public cloud infrastructure or a private cloud infrastructure. The data storage devices 1 to N may be hard disk drives (HDDs), solid state drives (SSDs), storage clusters, Amazon S3™ storage systems or any other data storage technology. Additionally, the database storage 106 may include distributed file systems (e.g., Hadoop Distributed File Systems (HDFS)), object storage systems, and the like.

The data platform 102 is used for reporting and analysis of integrated data from one or more disparate sources including the storage devices 1 to N within the database storage 106. The data platform 102 hosts and provides data reporting and analysis services to multiple customer accounts. Administrative users can create and manage identities (e.g., users, roles, and groups) and use permissions to allow or deny access to the identities to resources and services. Generally, the data platform 102 maintains numerous customer accounts for numerous respective customers. The data platform 102 maintains each customer account in one or more storage devices of the database storage 106. Moreover, the data platform 102 may maintain metadata associated with the customer accounts in the metadata database 114. Each customer account includes multiple data objects with examples including users, roles, permissions, stages, and the like.

The compute service manager 104 coordinates and manages operations of the data platform 102. The compute service manager 104 also performs query optimization and compilation as well as managing clusters of compute services that provide compute resources (also referred to as "virtual warehouses"). The compute service manager 104 can support any number and type of clients such as end users providing data storage and retrieval requests, system administrators managing the systems and methods described herein, and other components/devices that interact with compute service manager 104. As an example, the compute service manager 104 is in communication with the client device 112. The client device 112 can be used by a user of one of the multiple customer accounts supported by the data platform 102 to interact with and utilize the functionality of the data platform 102.

The compute service manager 104 is also coupled to metadata database 114. The metadata database 114 stores data pertaining to various functions and aspects associated with the data platform 102 and its users. In some examples, the metadata database 114 includes a summary of data stored in remote data storage systems as well as data available from a local cache. Additionally, the metadata database 114 may include information regarding how data is organized in remote data storage systems (e.g., the database storage 106) and the local caches. The metadata database 114 allows systems and services to determine whether a piece of data needs to be accessed without loading or accessing the actual data from a storage device.

The compute service manager 104 is further coupled to the execution platform 110, which provides multiple computing resources that execute various data storage and data retrieval tasks. In some examples, the compute service manager 104 communicates with the execution platform 110 concerning jobs and tasks using a queue within the data platform 102. This isolates the operations of the execution platform 110 and the client device 112. The execution platform 110 is coupled to the database storage 106. The execution platform 110 comprises a plurality of compute nodes. A set of processes on a compute node executes a query plan compiled by the compute service manager 104. The set of processes can include: a first process to execute the query plan; a second process to monitor and delete micro-partition files using a least recently used (LRU) policy and implement an out of memory (OOM) error mitigation process; a third process that extracts health information from process logs and status to send back to the compute service manager 104; a fourth process to establish communication with the compute service manager 104 after a system boot; and a fifth process to handle all communication with a compute cluster for a given job provided by the compute service manager 104 and to communicate information back to the compute service manager 104 and other compute nodes of the execution platform 110.

In some examples, communication links between elements of the computing environment 100 are implemented via one or more data communication networks. These data communication networks may utilize any communication protocol and any type of communication medium. In some examples, the data communication networks are a combination of two or more data communication networks (or sub-networks) coupled to one another. In alternate examples, these communication links are implemented using any type of communication medium and any communication protocol.

As shown in FIG. 1, the data storage devices data storage device 1 108*a* to data storage device N 108*d* are decoupled from the computing resources associated with the execution platform 110. This architecture supports dynamic changes to the data platform 102 based on the changing data storage/retrieval needs as well as the changing needs of the users and systems. The support of dynamic changes allows the data platform 102 to scale quickly in response to changing demands on the systems and components within the data platform 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The compute service manager 104, metadata database 114, execution platform 110, and database storage 106 are shown in FIG. 1 as individual discrete components. However, each of the compute service manager 104, metadata database 114, execution platform 110, and database storage 106 may be implemented as a distributed system (e.g., distributed across multiple systems/platforms at multiple geographic locations). Additionally, each of the compute service manager 104, metadata database 114, execution platform 110, and database storage 106 can be scaled up or down (independently of one another) depending on changes to the requests received and the changing needs of the data platform 102. Thus, in the described examples, the data platform 102 is dynamic and supports regular changes to meet the current data processing needs.

During operation, the data platform 102 processes multiple jobs determined by the compute service manager 104. These jobs are scheduled and managed by the compute service manager 104 to determine when and how to execute the job. For example, the compute service manager 104 may divide the job into multiple discrete tasks and may determine what data is needed to execute each of the multiple discrete tasks. The compute service manager 104 may assign each of the multiple discrete tasks to one or more nodes of the execution platform 110 to process the task. The compute service manager 104 may determine what data is needed to process a task and further determine which nodes within the execution platform 110 are best suited to process the task. Some nodes may have already cached the data needed to process the task and, therefore, be a good candidate for processing the task. Metadata stored in the metadata database 114 assists the compute service manager 104 in determining which nodes in the execution platform 110 have already cached at least a portion of the data needed to process the task. One or more nodes in the execution platform 110 process the task using data cached by the nodes and, if necessary, data retrieved from the database storage 106. It is desirable to retrieve as much data as possible from caches within the execution platform 110 because the retrieval speed is typically faster than retrieving data from the database storage 106.

As shown in FIG. 1, the computing environment 100 separates the execution platform 110 from the database storage 106. In this arrangement, the processing resources and cache resources in the execution platform 110 operate independently of the database storage devices data storage device 1 108*a* to data storage device N 108*d* in the database storage 106. Thus, the computing resources and cache resources are not restricted to a specific of the data storage device 1 108*a* to data storage device N 108*d*. Instead, all computing resources and all cache resources may retrieve data from, and store data to, any of the data storage resources in the database storage 106.

Figure 2:
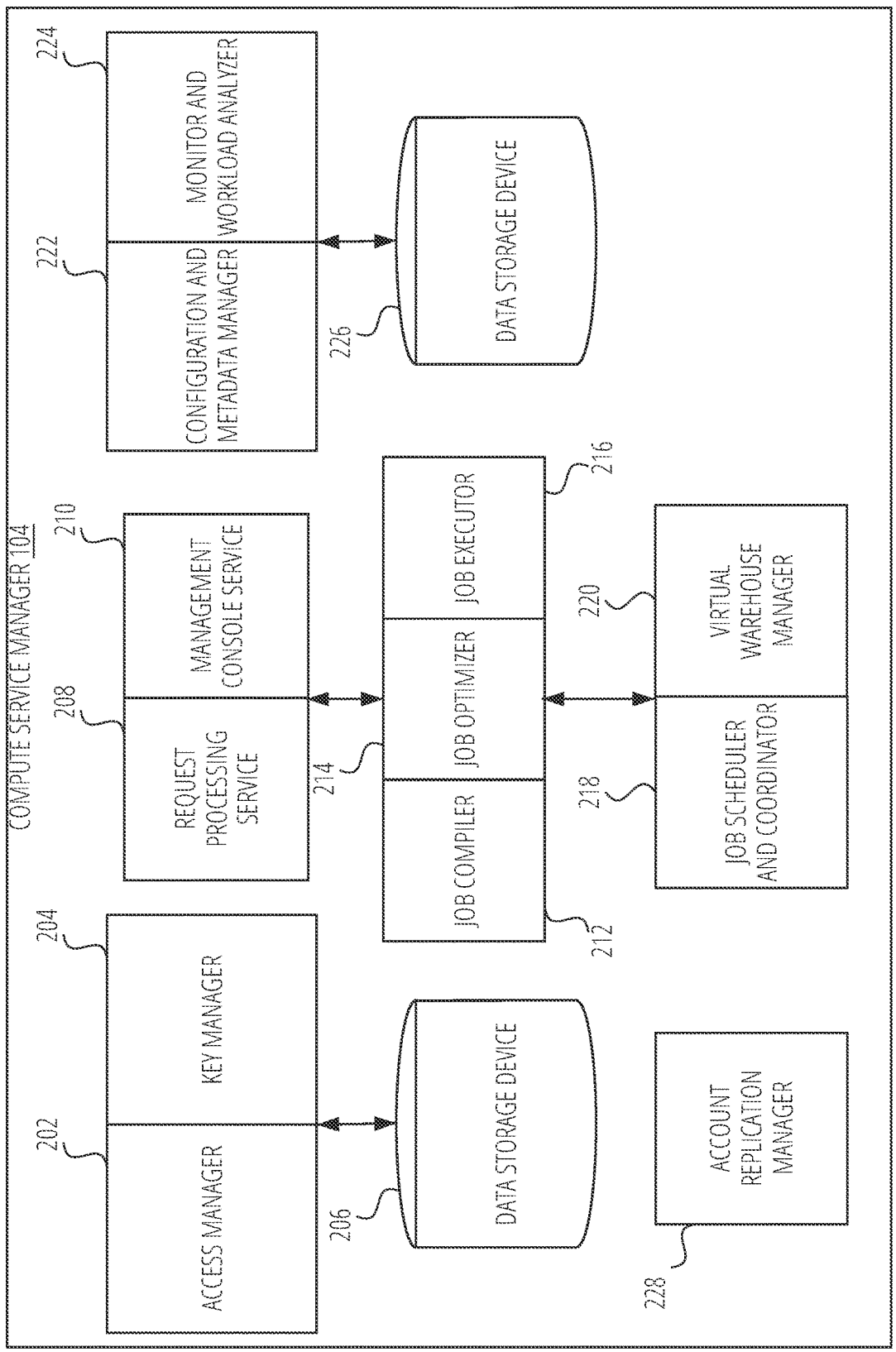
FIG. 2 is a block diagram illustrating components of a compute service manager, in accordance with some examples of the present disclosure.

FIG. 2 is a block diagram illustrating components of the compute service manager 104, in accordance with some examples of the present disclosure. As shown in FIG. 2, the compute service manager 104 includes an access manager 202 and a key manager 204 coupled to a data storage device 206. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in database storage 106). As used herein, the remote storage devices may also be referred to as "persistent storage devices" or "shared storage devices."

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in database storage 106.

A management console service 210 supports access to various systems and processes by administrators and other system managers. Additionally, the management console service 210 may receive a request to execute a job and monitor the workload on the system.

The compute service manager 104 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 104.

A job scheduler and coordinator 218 sends received jobs to the appropriate services or systems for compilation, optimization, and dispatch to the execution platform 110. For example, jobs may be prioritized and processed in that prioritized order. In an example, the job scheduler and coordinator 218 determines a priority for internal jobs that are scheduled by the compute service manager 104 with other "outside" jobs such as user queries that may be scheduled by other systems in the database but may utilize the same processing resources in the execution platform 110. In some examples, the job scheduler and coordinator 218 identifies or assigns particular nodes in the execution platform 110 to process particular tasks. A virtual warehouse manager 220 manages the operation of multiple virtual warehouses implemented in the execution platform 110. As discussed below, each virtual warehouse includes multiple execution nodes that each include a cache and a processor.

Additionally, the compute service manager 104 includes a configuration and metadata manager 222, which manages the information related to the data stored in the remote data storage devices and in the local caches (e.g., the caches in execution platform 110). The configuration and metadata manager 222 uses the metadata to determine which data micro-partitions need to be accessed to retrieve data for processing a particular task or job. A monitor and workload analyzer 224 oversees processes performed by the compute service manager 104 and manages the distribution of tasks (e.g., workload) across the virtual warehouses and execution nodes in the execution platform 110. The monitor and workload analyzer 224 also redistributes tasks, as needed, based on changing workloads throughout the data platform 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the data platform 102. For example, data storage device 226 may represent caches in execution platform 110, storage devices in database storage 106, or any other storage device.

As shown, the compute service manager 104 further includes an account replication manager 228. The account replication manager 228 is responsible for handling account replication including automatic replication of security features.

The compute service manager 104 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 1 304*a*) may need to communicate with another execution node (e.g., execution node 2 304*b*), and should be disallowed from communicating with a third execution node (e.g., execution node 1 316*a*) and any such illicit communication can be recorded (e.g., in a log or other location). Also, the information stored on a given execution node is restricted to data relevant to the current query and any other data is unusable, rendered so by destruction or encryption where the key is unavailable.

Figure 3:
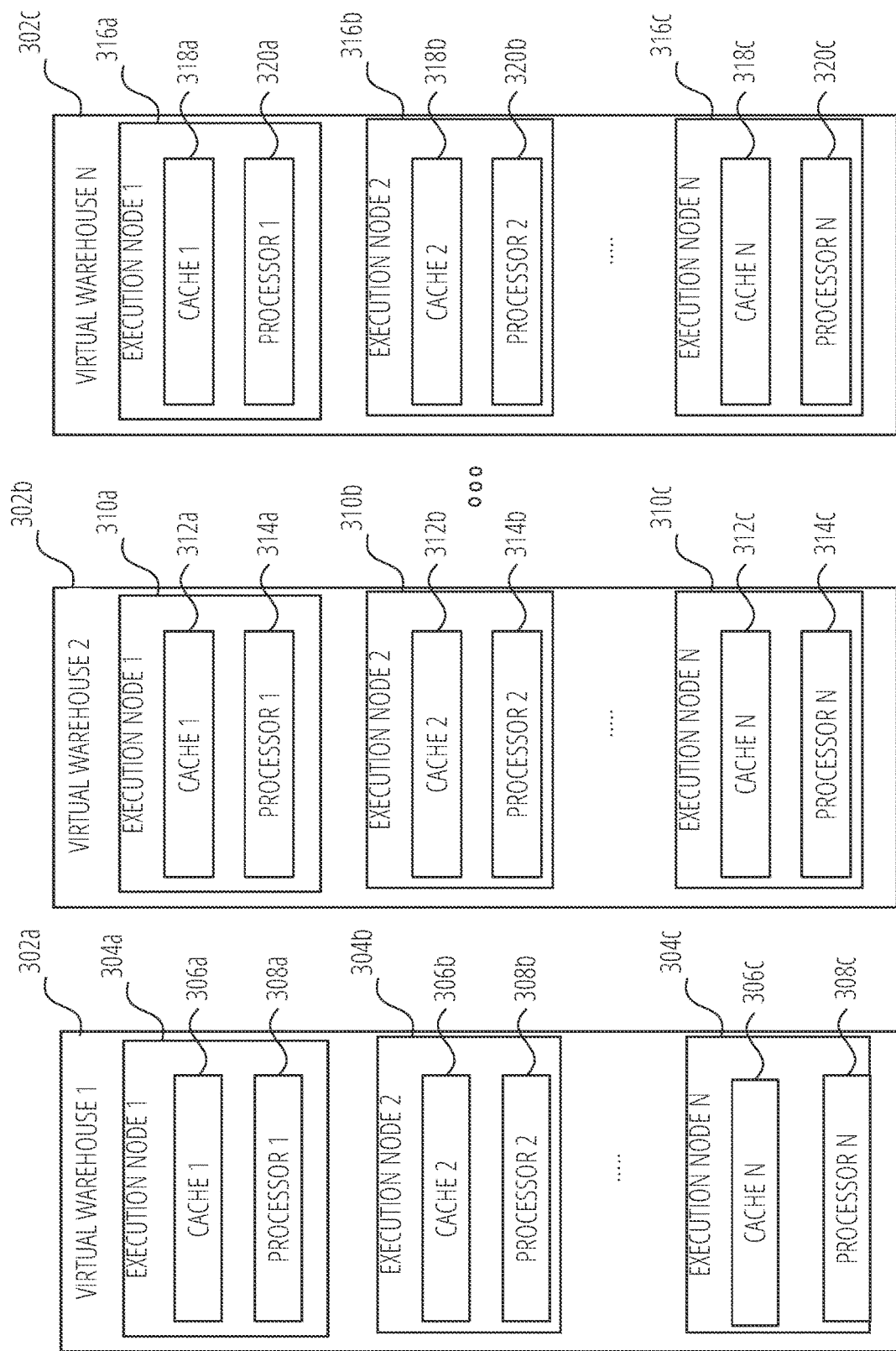
FIG. 3 is a block diagram illustrating components of an execution platform, in accordance with some examples of the present disclosure.

FIG. 3 is a block diagram illustrating components of the execution platform 110, in accordance with some examples of the present disclosure. As shown in FIG. 3, the execution platform 110 includes multiple virtual warehouses, including virtual warehouse 1 302*a*, and virtual warehouse 2 302*b* to virtual warehouse N 302*c*. Each virtual warehouse includes multiple execution nodes that each includes a data cache and a processor. The virtual warehouses can execute multiple tasks in parallel by using the multiple execution nodes. As discussed herein, the execution platform 110 can add new virtual warehouses and drop existing virtual warehouses in real time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in database storage 106).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 1 to N shown in FIG. 1. Thus, the virtual warehouses are not necessarily assigned to a specific data storage device 1 to N and, instead, can access data from any of the data storage devices 1 to N within the database storage 106. Similarly, each of the execution nodes shown in FIG. 3 can access data from any of the data storage devices 1 to N. In some examples, a particular virtual warehouse or a particular execution node may be temporarily assigned to a specific data storage device, but the virtual warehouse or execution node may later access data from any other data storage device.

In the example of FIG. 3, virtual warehouse 1 302*a* includes a plurality of execution nodes as exemplified by execution node 1 304*a*, execution node 2 304*b*, and execution node N 304*c*. Execution node 1 304*a* includes cache 1 306*a* and a processor 1 308*a*. Execution node 2 304*b* includes cache 2 306*b* and processor 2 308*b*. Execution node N 304*c* includes cache N 306*c* and processor N 308*c*. Each execution node 1 to N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 302*a* discussed above, virtual warehouse 2 302*b* includes a plurality of execution nodes as exemplified by execution node 1 310*a*, execution node 2 310*b*, and execution node N 310*c*. Execution node 1 310*a* includes cache 1 312*a* and processor 1 314*a*. Execution node 2 310*b* includes cache 2 312*b* and processor 2 314*b*. Execution node N 310*c* includes cache N 312*c* and processor N 314*c*. Additionally, virtual warehouse N 302*c* includes a plurality of execution nodes as exemplified by execution node 1 316*a*, execution node 2 316*b*, and execution node N 316*c*. Execution node 1 316*a* includes cache 1 318*a* and processor 1 320*a*. Execution node 2 316*b* includes cache 2 318*b* and processor 2 320*b*. Execution node N 316*c* includes cache N 318*c* and processor N 320*c*.

In some examples, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate examples may include execution nodes containing any number of processors and any number of caches. Additionally, the caches may vary in size among the different execution nodes. The caches shown in FIG. 3 store, in the local execution node, data that was retrieved from one or more data storage devices in database storage 106. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some examples, the caches are implemented using high-speed memory devices that provide fast access to the cached data. Each cache can store data from any of the storage devices in the database storage 106.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some examples, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor intensive. Similarly, an execution node may be assigned more cache resources if the tasks performed by the execution node require a larger cache capacity.

Although virtual warehouses 1, 2, and N are associated with the same execution platform 110, the virtual warehouses may be implemented using multiple computing systems at multiple geographic locations. For example, virtual warehouse 1 can be implemented by a computing system at a first geographic location, while virtual warehouses 2 and N are implemented by another computing system at a second geographic location. In some examples, these different computing systems are cloud-based computing systems maintained by one or more different entities.

Additionally, each virtual warehouse as shown in FIG. 3 has multiple execution nodes. The multiple execution nodes associated with each virtual warehouse may be implemented using multiple computing systems at multiple geographic locations. For example, an instance of virtual warehouse 1 302a implements execution node 1 304a and execution node 2 304b on one computing platform at a geographic location and implements execution node N 304c at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some examples, the virtual warehouses may operate on the same data in database storage 106, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4A:
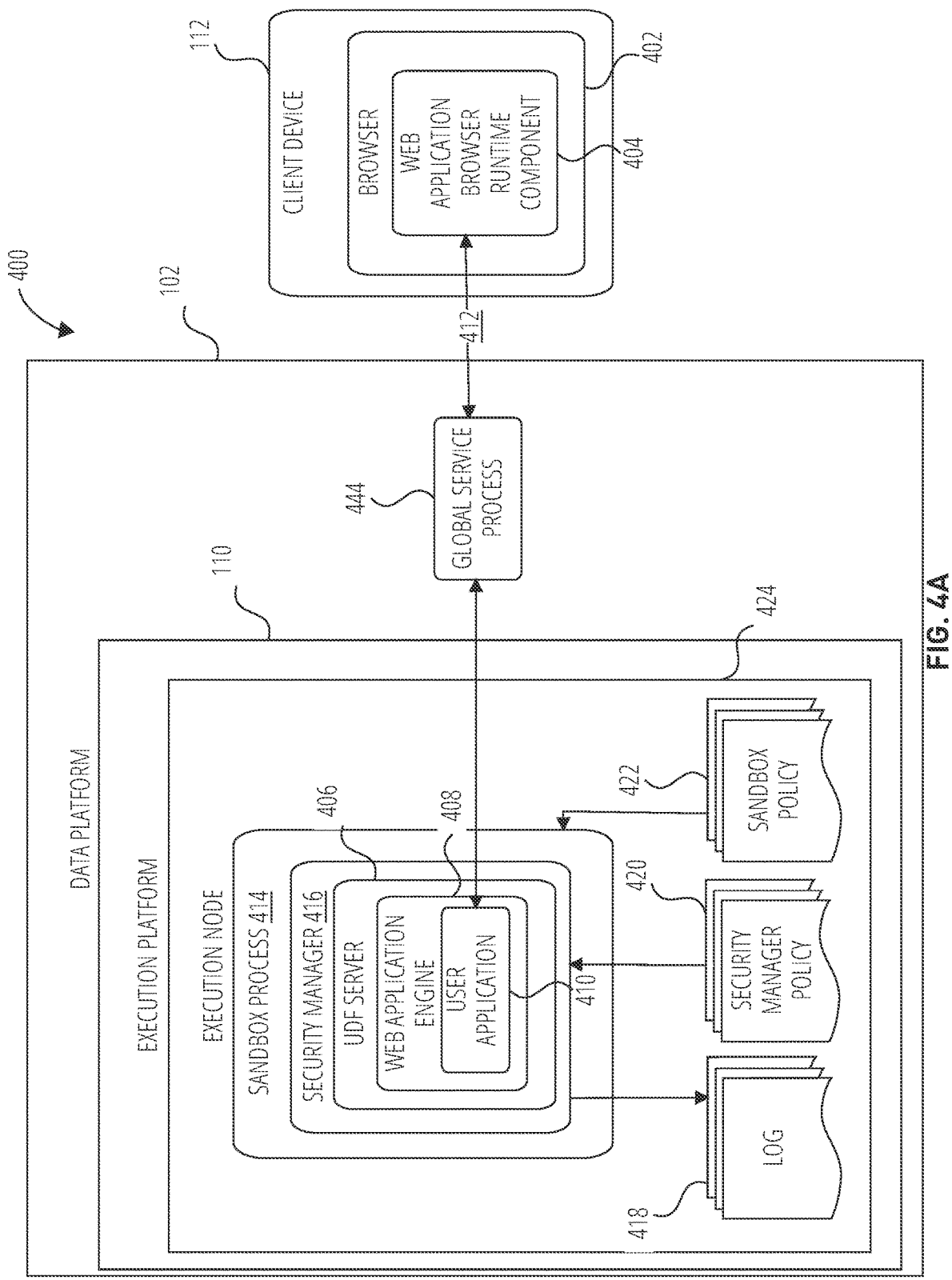
FIG. 4A is a deployment diagram of a computing environment for providing an application as a first-class database object in accordance with some examples of the present disclosure.

FIG. 4A is a deployment diagram of a computing environment 400 for providing a web application as a first-class database object in accordance with some examples. A data platform 102 utilizes the computing environment 400 to provide a secure framework for a user application 410 to be executed by an execution platform 110 of the data platform 102. The user application 410 and all of the components supporting the user application 410, such as, but not limited to, a Web application engine 408 and a User Defined Function (UDF) server 406, collectively referred to as a "web application" herein, are treated by the data platform 102 as first-class database objects in that can be instantiated using one or more commands within a database query as illustrated by the code fragments.

To create a new web application

```
CREATE [ OR REPLACE ] WEBAPP [ IF NOT EXISTS ]
<Webapp_name>
[ VERSIONS ] (versionList)
[ WAREHOUSE = <warehouse_name> ]
[ COMMENT = '<comment_string_literal>' ]
versionList : = versionInfo [, versionInfo ]
id = <webapp_version_name>
root_location = <app_root>
file_path = <file_name>
```

To drop a web application:

DROP WEBAPP[IF EXISTS]<webapp_name>

To alter an existing web application

```
ALTER WEBAPP [IF EXISTS] <webapp_name> SET
[ WAREHOUSE = <warehouse_name> ]
[ DEFAULT_VERSION = <webapp_version_name> ]
[ COMMENT = '<string_literal>' ]
ALTER WEBAPP [IF EXISTS] <webapp_name>
ADD [(| versionList [)]
ALTER WEBAPP [IF EXISTS] <webapp_name>
DROP [(|<webapp_version_name> [,<webapp_version_name>...][)]
ALTER WEBAPP [IF EXISTS] <webapp_name> MODIFY
[(| modifyWebappVersionList [)]
modifyWebappVersionList :=
modifyWebappVersionAttr [, modifyWebappVersionAttr]
modifyWebappVersionAttr := [VERSION] <webapp_version_name>
SET { root_location = <app_root> | file_path = <file_name> }
```

Where:
<Webapp_name> Specifies the identifier for the web application, unique for the schema it is created in.
<webapp_version_name> Specifies the identifier for the version of the web application.
<app_root> A reference to a stage URL that points to a root of the user application 410. When the user application runs, the files below this app_root will be available to the web application engine 408. Although versions can be in the same stage or data location within the data platform 102, separated only by prefixes it can be useful to have different stages per-version to manage permissions and cleanup better.
<file_name> A path to a user file to run as part of the web application engine 408. This is relative to the <app_root>.
<warehouse_name> A name of a virtual warehouse, such as virtual warehouse 1 302a of the data platform 102 to run the user application 410.
<comment_string_literal> Comment describing the web user application 410.

A partial list of permissions enforced by the security manager policy 420 and/or the sandbox policy 422 for the user application 410 and its supporting components are described in Table 1 and Table 2:

TABLE 1

| Privilege | Usage |
| --- | --- |
| CREATE WEBAPP | The ability to create a user application 410 and its associated components in a schema. |

TABLE 2

| Privilege | Usage |
| --- | --- |
| USAGE | Enables hitting the HTTPS endpoint for the user application 410 on the default version. Enables seeing the web application using DESCRIBE or SHOW commands |
| ALL [PRIVILEGES] | Grant all privileges other than OWNERSHIP |
| OWNERSHIP | Grants full control over the web application; required to drop the user application 410. Only a single role can hold this privilege on a specific object at a time |

In some examples, there are objects of the data platform 102 that the user application 410 depends on, such as, but not limited to, a storage location or stage for storing files, and a virtual warehouse, such as virtual warehouse 1 302a, within which the user application 410 is loaded. When creating a user application 410 and its associated components that reference a stage, the user application 410 inherits READ permissions to that stage and USAGE permissions to the virtual warehouse.

In some examples, the web application has direct access to source files that define the operations of the web application, but a user of the web application does not have the same permissions to access the source files. The web application accesses the source files via the stage.

In some examples, if a stage's permissions are changed after a user application 410 is created, such that the owner of the user application 410 no longer has permissions to it, then requests to the user application 410 will fail with an error stating that the user application 410 does not exist. If a Warehouse's permissions are changed after the user application 410 is created, then the logic for the warehouse to use will act as if no warehouse was set.

In some examples, a stage or data location is embedded in the user application 410 or one of its associated components and the permissions to the user application 410 and the permissions of the stage are associated together. In some examples, a user application 410 and its related components may be shared with other owners or users in accordance with permissions stored in the security manager policy 420 and/or sandbox policy 422.

Accordingly, when instantiated, the user application 410 and all of its supporting components inherit all of the attributes of a first-class object within a database provided by the data platform 102 including permissions and restrictions that may be utilized by the data platform 102 to manage a database object. In some examples, the user application 410 is provided as a service by the UDF server 406 utilizing the web application engine 408 and can be accessed over a network, such as the Internet, by a web application browser runtime component 404 included in a browser 402 hosted by a client device 112 utilizing protocols that are used to access documents and files on the World Wide Web.

As described in reference to FIG. 2, the compute service manager 104 implements security protocols that validate all communication from the execution platform 110 to validate that the content and context of that communication are consistent with the task(s) known to be assigned to the execution platform 110. For example, the execution platform 110 executing a query A is not allowed to request access to a particular data source (e.g., data storage device 226 or any one of the storage devices in the database storage 106) that is not relevant to query A. In an example, an execution node 424 may need to communicate with a second execution node but the security mechanisms described herein can disallow communication with a third execution node. Moreover, any such illicit communication can be recorded (e.g., in a log 418 or other location). Further, the information stored on a given execution node is restricted to data relevant to the current query and any other data is unusable by destruction or encryption where the key is unavailable.

In some examples, the UDF server 406 and its components, such as the web application engine 408 and the user application 410 are implemented in a particular programming language such as Python, and the like. In some examples, the web application browser runtime component 404 is implemented in a different programming language (e.g., C or C++) than the UDF server 406, which can further improve security of the computing environment 400 by using a different codebase (e.g., one without the same or fewer potential security exploits).

The UDF server 406 receives communications from the web application browser runtime component 404 via the global service process 444 of the data platform 102. The global service process 444 is responsible for receiving requests from the web application browser runtime component 404. The global service process 444 uses components of the compute service manager 104 to perform various authentication tasks including a first level of authorization using an access manager 202 of the compute service manager 104. The UDF server 406 performs tasks including assigning processing threads to execute user code of the user application 410 and returning the results generated by the user application 410 to the web application browser runtime component 404 via the global service process 444.

In some examples, the UDF server 406 executes within a sandbox process 414 as more fully described below. In some embodiments, the UDF server 406 is implemented in Python interpreted by an interpreter process. In some examples, the UDF server 406 is implemented in another language, such as Java, executed by a virtual machine (JVM). Since the UDF server 406 advantageously executes in a separate process relative to the browser 402, there is a lower risk of malicious manipulation of the user application 410.

Results of performing an operation, among other types of information or messages, can be stored in a log 418 for review and retrieval. In an embodiment, the log 418 can be stored locally in memory at the execution node 424, or at a separate location such as the database storage 106.

In some examples, a security manager 416, can prevent completion of an operation from a user application 410 by throwing an exception (e.g., if the operation is not permitted), or returns (e.g., doing nothing) if the operation is permitted. In an implementation, the security manager 416 is implemented as a security manager object that allows an application to implement a security policy such as a security manager policy 420 and enables the application to determine, before performing a possibly unsafe or sensitive operation, what the operation is and whether it is being attempted in a security context that allows the operation to be performed. The security manager policy 420 can be implemented as a file with permissions that the UDF server 406 is granted. The UDF server 406 therefore can allow or disallow the operation based at least in part on the security policy.

In some embodiments, the sandbox process 414 reduces the risk of security breaches by restricting the running environment of untrusted applications using security mechanisms such as namespaces and secure computing modes (e.g., using a system call filter to an executing process and all its descendants, thus reducing the attack surface of the kernel of a given operating system). Moreover, in an example, the sandbox process 414 is a lightweight process and is optimized (e.g., closely coupled to security mechanisms of a given operating system kernel) to process a database query or other service request in a secure manner within the sandbox environment.

In some examples, the sandbox process 414 can utilize a virtual network connection in order to communicate with other components within the computing environment 400. A specific set of rules can be configured for the virtual network connection with respect to other components of the computing environment 400. For example, such rules for the virtual network connection can be configured for a particular UDF server 406 to restrict the locations (e.g., particular sites on the Internet or components that the UDF server 406 can communicate) that are accessible by operations performed by the UDF server 406. Thus, in this example, the UDF server 406 can be denied access to particular network locations or sites on the Internet.

The sandbox process 414 can be understood as providing a constrained computing environment for a process (or processes) within the sandbox, where these constrained processes can be controlled and restricted to limit access to certain computing resources.

Examples of security mechanisms can include the implementation of namespaces in which each respective group of processes executing within the sandbox environment has access to respective computing resources (e.g., process IDs, hostnames, user IDs, file names, names associated with network access, and inter-process communication) that are not accessible to another group of processes (which may have access to a different group of resources not accessible by the former group of processes), other container implementations, and the like. By having the sandbox process 414 execute as a sub-process, in some examples, latency in processing a given database query can be substantially reduced in comparison with other techniques that may utilize a virtual machine solution by itself.

As further illustrated, the sandbox process 414 can utilize a sandbox policy 422 to enforce a given security policy. The sandbox policy 422 can be a file with information related to a configuration of the sandbox process 414 and details regarding restrictions, if any, and permissions for accessing and utilizing system resources. Example restrictions can include restrictions to network access, or file system access (e.g., remapping file system to place files in different locations that may not be accessible, other files can be mounted in different locations, and the like). The sandbox process 414 restricts the memory and processor (e.g., CPU) usage of the UDF server 406, ensuring that other operations on the same execution node can execute without running out of resources.

The web application browser runtime component 404 provides a frontend for the user application 410. The web application browser runtime component 404 performs browser interactions with the data platform 102 for the user application 410. Components of the computing environment 400 communicate using a communication channel 412 that provides a set of commands that are used for interactions between the user application 410 and the browser 402. The communication channel 412 logically interacts with the user application 410, and physically goes through the layers of the data platform 102 to ensure security restrictions and policies are enforced at each layer. These may include permissions or runtime requirements from the compute service manager 104.

The web application browser runtime component 404 sends back messages that are processed by the execution platform 110 and responded to with a series of forward messages.

The web application engine 408 includes instructions that can be defined by third parties but are run as an application within the execution platform 110. The web application engine 408 provides programming frameworks that users can build applications, such as the user application 410. In some examples, the web application engine 408 is written in Python and is treated by the execution platform 110 as special Python stored procedures. In some examples, the web application engine 408 is written in another language, such as, but not limited to Java, and hosted by a virtual machine within the execution platform 110. In some examples, third parties may build their own web application engines.

The user application 410 comprises an application written by an end user and evaluated by the web application engine 408. In some examples, the user application 410 comprises Python files that are evaluated by a proprietary Python interpreter.

The UDF server 406 is in charge of running UDFs in a controlled execution environment such as the sandbox process 414. In some examples, the UDF server 406 comprises a Python UDF server. In some examples, the UDF server 406 utilizes other languages, such as Java.

In some examples, a Uniform Resource Locator (URL) identification of an assigned to the UDF server 406 is a unique value that is stable across replications of the UDF server 406. For example, the URL identification is a randomly generated string that is unique within an account of an owner. The URL identification may be created by using a UUID4 and Base64 encoding to give it a more concise representation.

In some examples, a schema object of the data platform 102 is used to define the components of the web application such as, but not limited to, the UDF server 406, the web application engine 408, the user application 410, and the web application browser runtime component 404. The name, network endpoint, permissions and policies are based on this object. In some examples, the schema object includes a particular version of a web application engine 408 to use as well as any resource constraints.

In some examples, version of a user's code is specified and will associate a named version of a web application that refers to a place on a storage location or stage used by the data platform 102 to run user code.

Figure 4B:
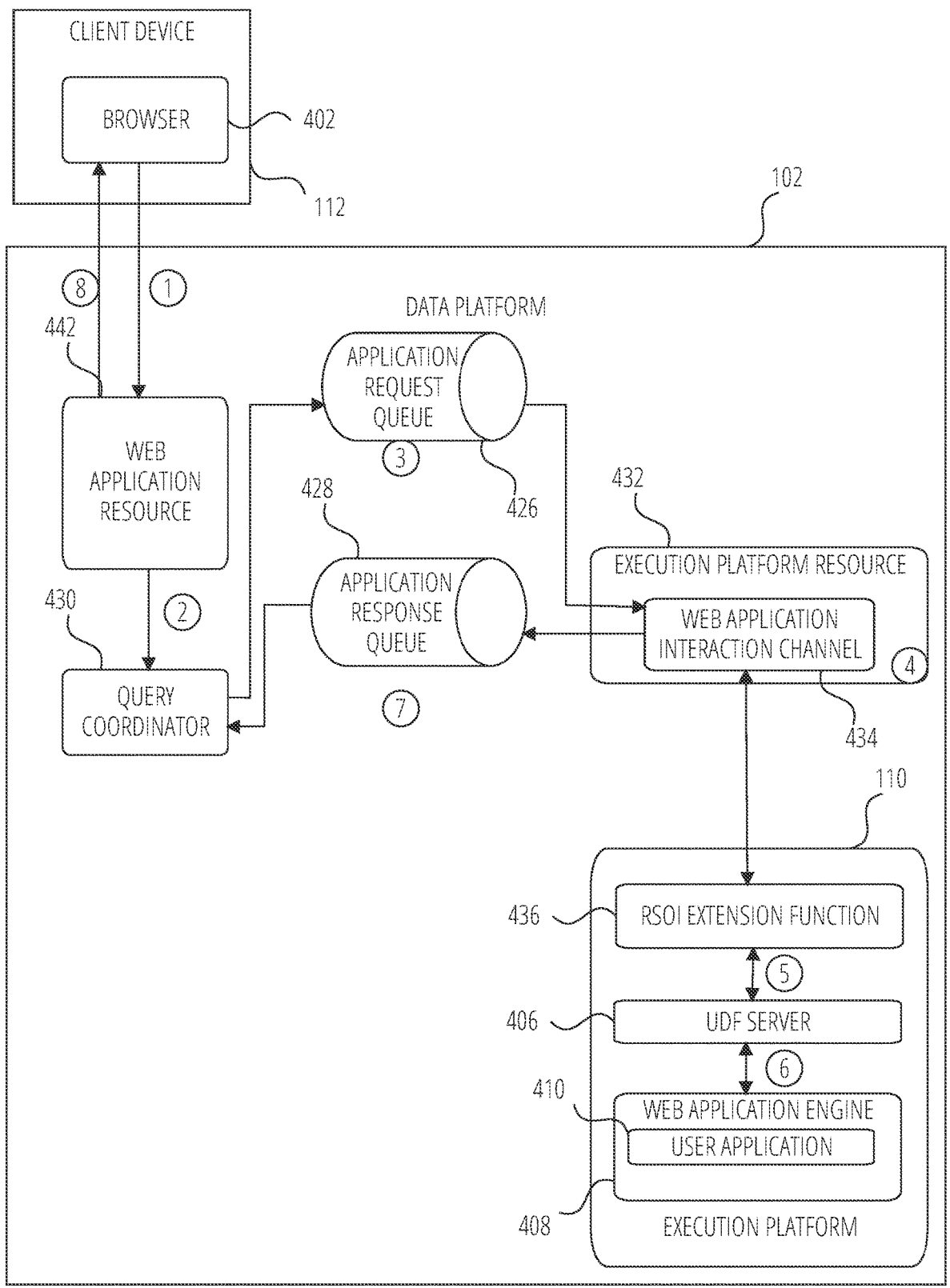
FIG. 4B, FIG. 4C, and FIG. 4D are interaction and data flow diagrams of a computing environment for providing an application as a first-class database object in accordance with some examples of the present disclosure.
Figure 4C:
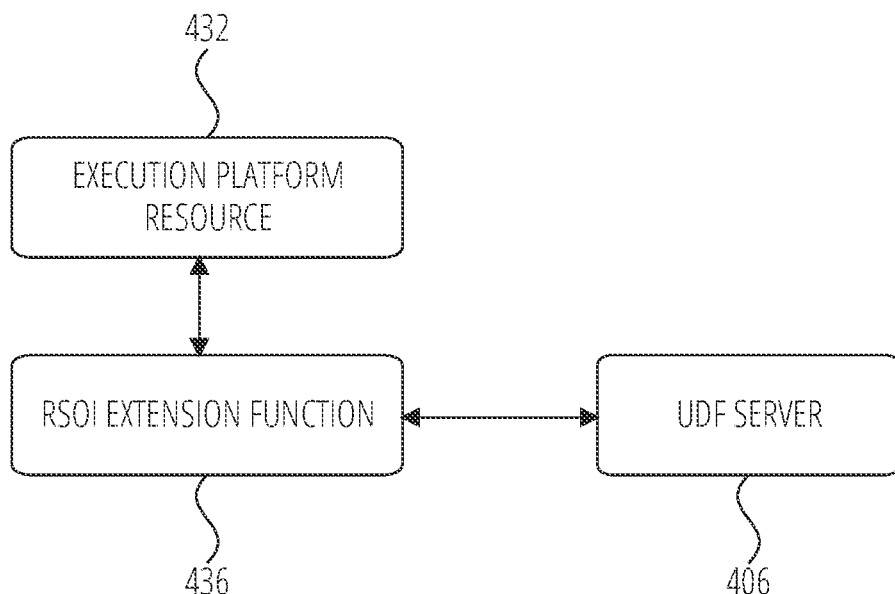
Figure 4D:
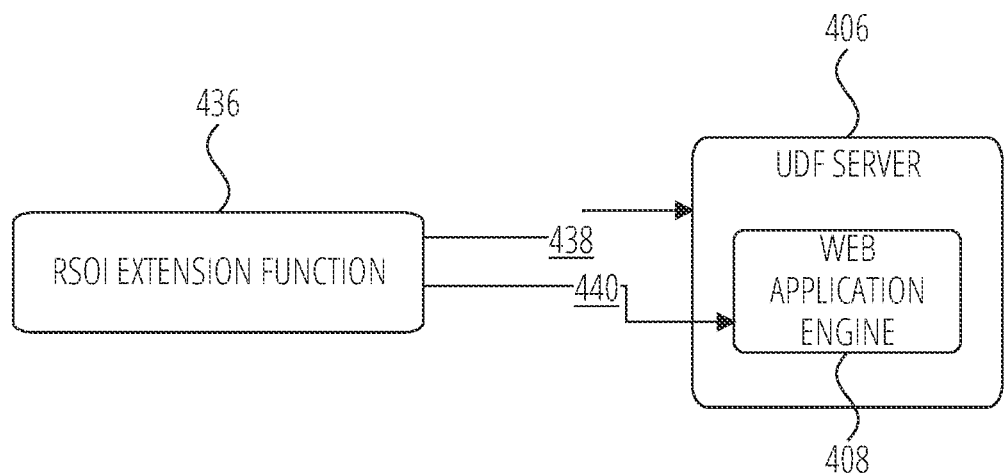

FIG. 4B, FIG. 4C, and FIG. 4D are interaction and data flow diagrams of the computing environment 400 for providing a web application as a first-class database object in accordance with some examples.

The computing environment 400 utilizes Row Set Operators (RSOs) that run as part of a program in the execution platform 110. An RSOI is an instance of an RSO that operates on a processing thread of the execution platform 110. An RSOI extension function is an RSOI that runs stored procedures. In some examples, the stored procedures are written in Python. In some examples, the stored procedures are written in Java.

The owner role of the database object defines how metadata such as permissions are stored. Permissions are set on the database object define the security can use the RSOI extension function 436, and which role it runs as. Setting these permissions happens when a user defines the database object, and enforcement happens in the web application resource 442 when the browser accesses a URL associated with the web application, and through the role used to run RSOI extension function 436. The web application resource 442 will also start the job, which sets its permissions context. The RSOI extension function 436 operates within that permissions/session context.

In some examples, an owner sets permissions on each of the objects that will be instantiated such as, but not limited to, a UDF server 406, a web application engine 408, and a user application 410.

In some examples, various HTTP responses are set to govern whether the browser security policies are enforced based on permissions defined in the security manager policy 420.

In operation 1, a user uses the browser 402 to communicate a request to the data platform 102 for data of a database object of the data platform 102. The browser 402 hosted by client device 112 uses a Web socket connection to a web application resource 442 to communicate with user application 410 hosted by the data platform 102 that will access the database object. When the web application resource 442 detects that the browser 402 is making the request, the access manager 202 of the compute service manager 104 of the data platform 102 authorizes access to the user application 410 based on a set of security policies stored on data storage device 206.

The web application browser runtime component 404 pulls back messages off the web socket and issues appropriate commands. If there is no current session having an instance of the web application engine 408, the web application browser runtime component 404 verifies the request has permissions to use the user application 410 based on the security manager policy 420, then requests start of a job by the UDF server 406. An initial execution plan starts an instance of a web application engine 408 for the job using a security context of the user application 410. The web application engine 408 will be instantiated based on the security manager policy 420 and the sandbox policy 422 enforced respectively by the security manager 416 and the sandbox process 414, and the event is logged into the log 418. After there is a session of the web application engine 408 started, the web application engine 408 sends commands to a query coordinator 430.

In operation 2, the job has the query coordinator 430 associated with the job. From this point on, communication to the web application engine 408 occurs by adding query coordinator events of type "application interaction" to the query coordinator 430. This results in a run request being enqueued. The query coordinator event also has a reference to a stream it can send forward messages through to get to the browser 402. That way the query coordinator 430 can get the response events and pass them directly back to the browser 402.

In operation 3, an application request queue 426 is provided. The application request queue 426 is an in-memory queue that back messages are pushed onto. In some examples, the application request queue 426 is in memory to ensure the connection at operation 4 always goes back to the same global service instance as the query coordinator 430 is on. In some examples, in the case of a global service failure, it is permissible to lose the messages and have the web application browser runtime component 404 re-establish the state through a new run request.

In operation 4, an RSOI extension function 436 launches a special stored procedure that runs for a long time. This stored procedure runs in the security context that was configured for the objects that will be instantiated on the execution node 424 based on the security manager policy 420 and the sandbox policy 422. The stored procedure creates a UDF server 406 that securely runs scripts in the locked down environment of the execution node 424 of the execution platform 110. The RSOI extension function 436 starts the web application engine 408 based on the stored procedure through the UDF server 406 using RPC calls. The RSOI extension function 436 calls an "execute procedure" with function information that will tell the stored procedure of the web application engine 408 not to terminate. The web application engine 408 is instantiated based on the security manager policy 420 and the sandbox policy 422 enforced, respectively, by the security manager 416 and the sandbox process 414 during a verification process, and the event is logged into the log 418. The procedure of the web application engine 408 connects to a stream application requests RPC endpoint on the UDF server 406 and issues an initialize application message. That message will be used to bootstrap the web application engine 408 with the appropriate policy and file information to run the user application 410. This information comes down as part of the execution plan of operation 1 that starts the user application 410. The RSOI extension function 436 connects to a web application interaction channel 434 endpoint in an execution platform resource 432, and processes messages that come in through that channel. The UDF server 406 is then able to run the web application engine 408 and the user application 410 using the special stored procedure to proxy communications from the browser in a low-latency and efficient way.

In some examples, network endpoints are determined based on the account locator based URLs, thus providing a domain for owner's account and each web application associated with the owner's account to act as a browser security boundary. In additional examples, components of an URL identifier are unique, an unguessable numbers. The URL identifications are stable across renames and replication to other accounts. A user of the browser 402 may access the URL directly. To do so, they will be required to be logged in to the data platform 102, and they will need usage privileges on the user application 410.

The messages coming from the execution platform resource 432 are user driven interactions that come from either using or editing an application. The messages that go to the UDF server 406 are defined in a document that defines the UDF application requests. For application user requests, the RSOI extension function 436: 1. Acts as a proxy server and communicates back message requests to an appropriate UDF server 406, and leaves them to be processed by the web application engine 408; 2. Receives an update file message request that commands the RSOI extension function 436 to: a. Find files that need to be updated; b. Issue an update file start command; c. Follow with the update file commands needed to update the appropriate files used by the web application engine 408; and d. Generate an update files end message.

All access to the execution platform 110 such as, but not limited to, data stored in the database storage 106 and additional functions and procedures executed by the execution platform 110, by the user application 410 using the web application engine 408 is verified by the security manager 416 and the sandbox process 414 using the security manager policy 420 and the sandbox policy 422, respectively. This allows the execution platform 110 to provide services to the browser 402 by the user application 410 without requiring the data to move between a secured location and an unsecured location with the execution platform 110, thus enhancing scalability and security. In some examples, for the HTTP channel for an "execution platform resource" command, ContentType=application/octet-stream is used, with the Protobuf protocol being used in both directions. In some examples, the Protobuf protocol is used in both directions in a coded fashion that will allow pushing multiple messages down a stream without having to close the TCP connection and re-issue a request.

In operation 5, in reference to FIG. 4D, the UDF server 406 manages the lifecycle of the web application engine 408. The UDF server 406 launches and then manages requests that come in through a stream application requests endpoint. With reference to FIG. 4D, in some examples, there are two basic types of messages: application user requests 440 and application control plane requests 438. Application user requests 440 get passed directly into a run method for the web application engine 408. Application control plane requests 438 are directed to the UDF server 406 to do some system operation, such as but not limited to, updating files, initializing applications or shutting things down.

In operation 6, a web application procedure includes additional lifecycle functions that get called. An example web application procedure is partially illustrated in the code fragment:

```
// Called when InitializeApp message comes in
def start(webApp: WebApp, config: ConfigurationParameters)
// Main function for processing app requests.
// Called for each BackMsg that comes in
def run(webApp: WebApp, message: BackMsg, responseQueue
queue<ForwardMsg>, sessionCtx: SessionCtx)
// Called when the files are updated
    def beforeFilesChanged(webApp: WebApp, files: List<Files>)
    def afterFilesChanged(webApp: WebApp, files: List<Files>)
// Called before the app ends
def stop(webApp: WebApp)
```

In some examples, the UDF server 406 knows what functions associate with which operations by being specified in a stored procedure Data Persistence Object (DPO) passed down as part of starting the web application engine 408. In some examples, the UDF server 406 knows what functions associate with which operations as a stored procedure DPO has a handler as a start function, and a return type of the start function returns a table of functions that specifies other functions. In some examples, the UDF server 406 knows what functions associate with which operations as a stored procedure DPO has a handler as the start function, and annotations are provided that the UDF server 406 can look for to find other functions. In some examples, a new property on a stored procedure marks the stored procedure as a web application engine 408. When this is set, a handler calls a function that returns a table of the functions that map to the different application lifecycle events above (e.g., run, files changed, etc.)

In operation 7, responses from the UDF server 406 come back through an execution platform resource. When the user application 410 adds messages to an application response queue 428, the UDF server 406 will take those responses and pass them back through the RPC endpoint to the RSOI extension function 436, which will then send them down a long-poll HTTP connection to the web-app-interaction-channel in the execution platform resource. The execution platform resource puts the responses in the application response queue 428 and notifies the query coordinator 430.

In operation 8, the query coordinator 430 sends the response back to the browser 402. The query coordinator 430 picks up the events, filters out any messages that violate policy (e.g. unrestricted JS or HTML). As the query coordinator 430 was already provided with the response channel when it got the query coordinator event, so it uses this to send back a response. In some examples, when it is assured that the web socket is in a same global service as the query coordinator 430, the execution platform resource sends the request itself. In some examples, when it cannot be assured that the web socket is in the same global service as the query coordinator 430, the query coordinator 430 performs the operation of sending back the response as there is already functionality to find the right global service instance for the query coordinator 430.

Figure 5:
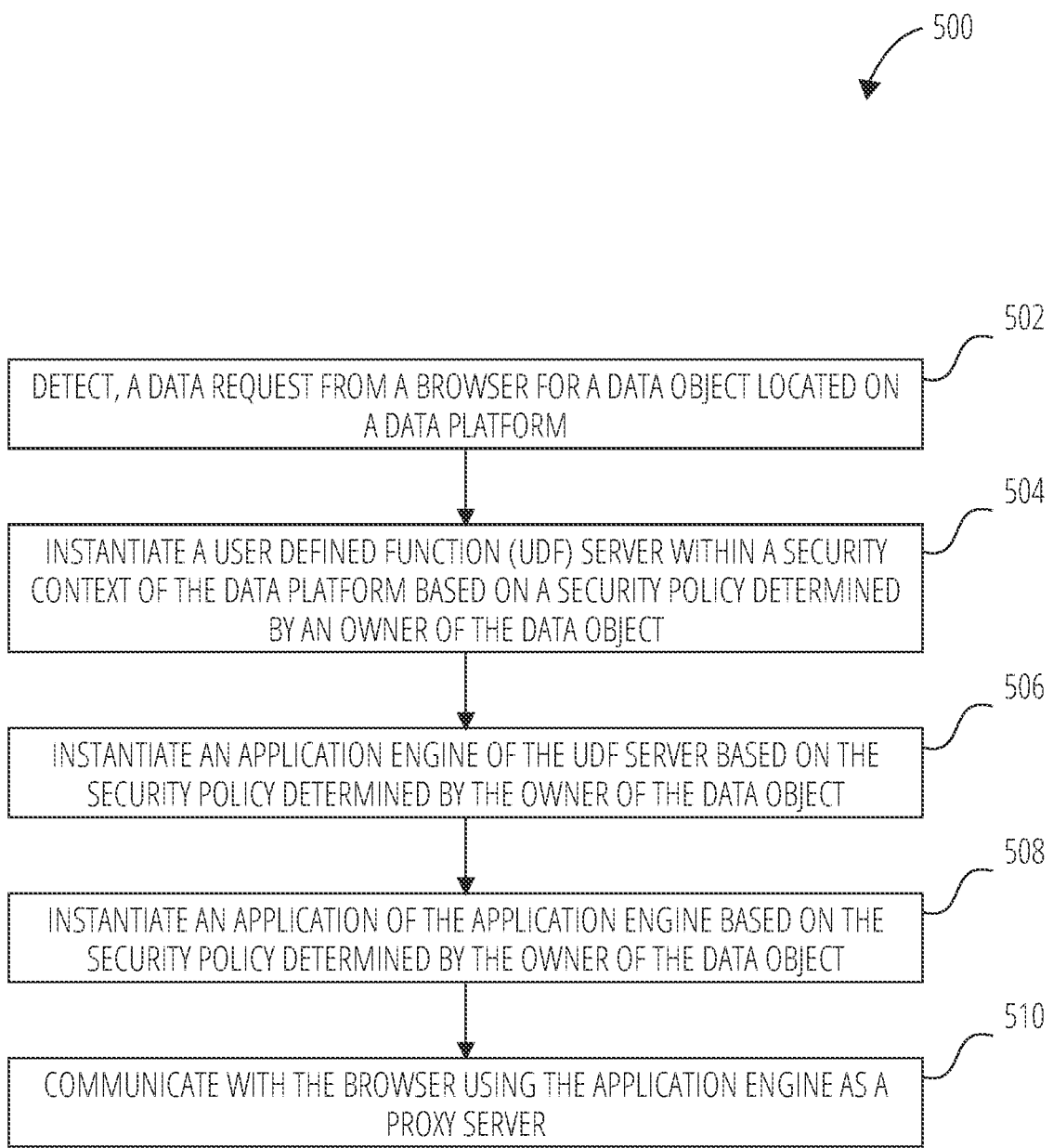
FIG. 5 is an activity diagram of a method of a data platform in accordance with some examples of the present disclosure.

FIG. 5 is an activity diagram of a method 500 of a data platform 102 in accordance with some examples. The data platform 102 uses the method 500 to implement a web application as a first-class database object.

In operation 502, the data platform detects a data request from a browser 402 for a database object located on the data platform 102 and stored in database storage 106.

In operation 504, the data platform 102 instantiates a UDF server 406 within a security context of the data platform 102 based on a security policy determined by an owner of the database object.

In operation 506, the data platform 102 instantiates a web application engine 408 of the UDF server 406 based on the security policy determined by the owner of the database object.

In operation 508, the data platform 102 instantiates a user application 410 of the web application engine 408 based on the security policy determined by the owner of the database object.

In operation 510, the data platform 102 communicates with the browser 402 using the web application engine 408 as a proxy server.

Figure 6:
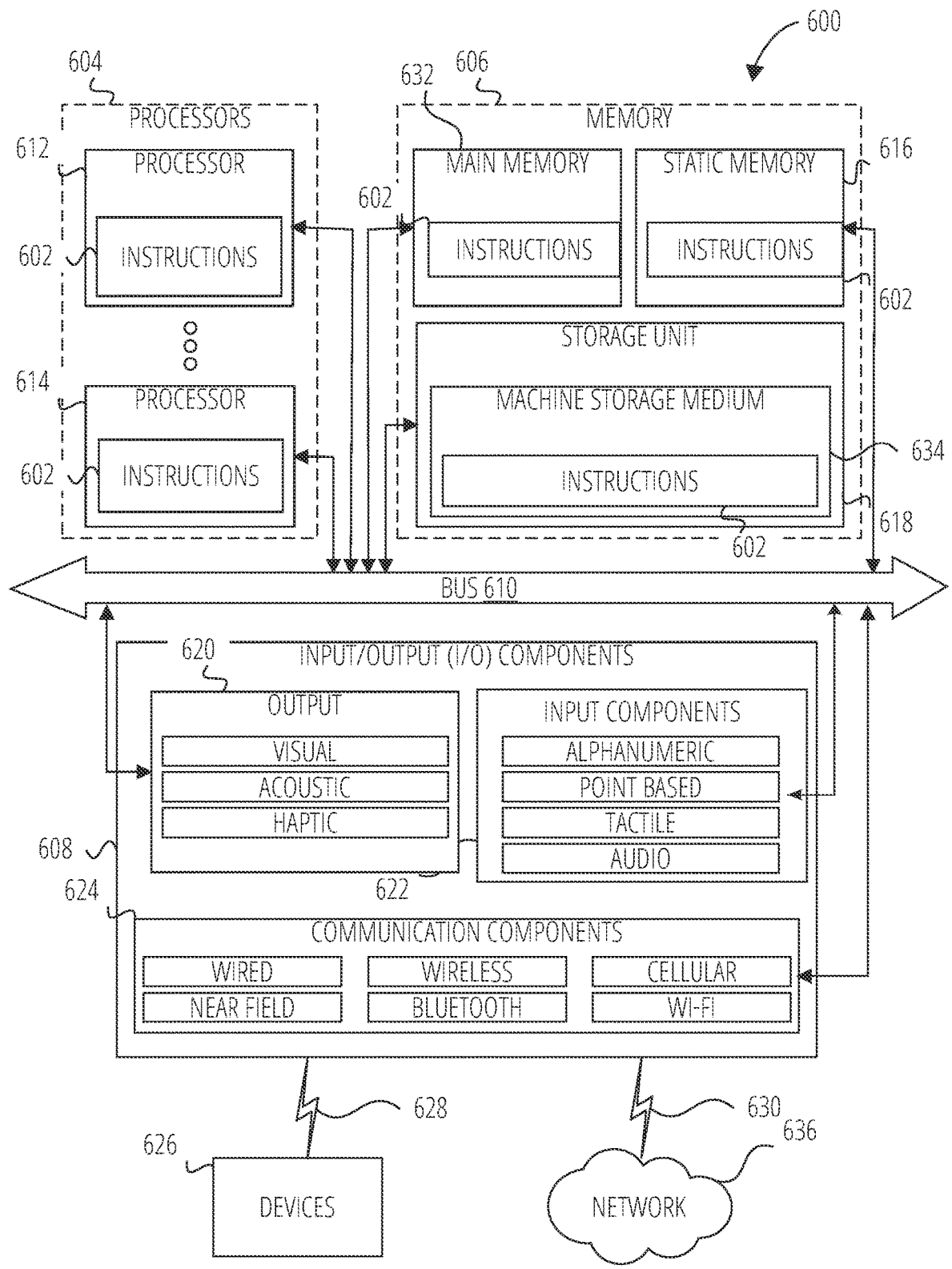
FIG. 6 illustrates a diagrammatic representation of a machine in the form of a computer system within which a set of instructions may be executed for causing the machine to perform any one or more of the methodologies discussed herein, in accordance with some examples of the present disclosure.

FIG. 6 illustrates a diagrammatic representation of a machine 600 in the form of a computer system within which a set of instructions may be executed for causing the machine 600 to perform any one or more of the methodologies discussed herein, according to examples. Specifically, FIG. 6 shows a diagrammatic representation of the machine 600 in the example form of a computer system, within which instructions 602 (e.g., software, a program, an application, an applet, an app, or other executable code) for causing the machine 600 to perform any one or more of the methodologies discussed herein may be executed. For example, the instructions 602 may cause the machine 600 to execute any one or more operations of any one or more of the methods described herein. In this way, the instructions 602 transform a general, non-programmed machine into a particular machine 600 (e.g., the compute service manager 104, the execution platform 110, and the data storage devices 1 to N of database storage 106) that is specially configured to carry out any one of the described and illustrated functions in the manner described herein.

In alternative examples, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 602, sequentially or otherwise, that specify actions to be taken by the machine 600. Further, while only a single machine 600 is illustrated, the term "machine" shall also be taken to include a collection of machines that individually or jointly execute the instructions 602 to perform any one or more of the methodologies discussed herein.

The machine 600 includes processors 604, memory 606, and I/O components 608 configured to communicate with each other such as via a bus 610. In an example, the processors 604 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, multiple processors as exemplified by processor 612 and a processor 614 that may execute the instructions 602. The term "processor" is intended to include multi-core processors that may comprise two or more independent processors (sometimes referred to as "cores") that may execute instructions 602 contemporaneously. Although FIG. 6 shows multiple processors 604, the machine 600 may include a single processor with a single core, a single processor with multiple cores (e.g., a multi-core processor), multiple processors with a single core, multiple processors with multiple cores, or any combination thereof.

The memory 606 may include a main memory 632, a static memory 616, and a storage unit 618 including a machine storage medium 634, all accessible to the processors 604 such as via the bus 610. The main memory 632, the static memory 616, and the storage unit 618 store the instructions 602 embodying any one or more of the methodologies or functions described herein. The instructions 602 may also reside, completely or partially, within the main memory 632, within the static memory 616, within the storage unit 618, within at least one of the processors 604 (e.g., within the processor's cache memory), or any suitable combination thereof, during execution thereof by the machine 600.

The input/output (I/O) components 608 include components to receive input, provide output, produce output, transmit information, exchange information, capture measurements, and so on. The specific I/O components 608 that are included in a particular machine 600 will depend on the type of machine. For example, portable machines such as mobile phones will likely include a touch input device or other such input mechanisms, while a headless server machine will likely not include such a touch input device. It will be appreciated that the I/O components 608 may include many other components that are not shown in FIG. 6. The I/O components 608 are grouped according to functionality merely for simplifying the following discussion and the grouping is in no way limiting. In various examples, the I/O components 608 may include output components 620 and input components 622. The output components 620 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 622 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 608 may include communication components 624 operable to couple the machine 600 to a network 636 or devices 626 via a coupling 630 and a coupling 628, respectively. For example, the communication components 624 may include a network interface component or another suitable device to interface with the network 636. In further examples, the communication components 624 may include wired communication components, wireless communication components, cellular communication components, and other communication components to provide communication via other modalities. The devices 626 may be another machine or any of a wide variety of peripheral devices (e.g., a peripheral device coupled via a universal serial bus (USB)). For example, as noted above, the machine 600 may correspond to any one of the compute service manager 104, the execution platform 110, and the devices 626 may include the data storage device 226 or any other computing device described herein as being in communication with the data platform 102 or the database storage 106.

The various memories (e.g., 606, 616, 632, and/or memory of the processor(s) 604 and/or the storage unit 618) may store one or more sets of instructions 602 and data structures (e.g., software) embodying or utilized by any one or more of the methodologies or functions described herein. These instructions 602, when executed by the processor(s) 604, cause various operations to implement the disclosed examples.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various examples, one or more portions of the network 636 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 636 or a portion of the network 636 may include a wireless or cellular network, and the coupling 630 may be a Code Division Multiple Access (CDMA) connection, a Global System for Mobile communications (GSM) connection, or another type of cellular or wireless coupling. In this example, the coupling 630 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 602 may be transmitted or received over the network 636 using a transmission medium via a network interface device (e.g., a network interface component included in the communication components 624) and utilizing any one of a number of well-known transfer protocols (e.g., hypertext transfer protocol (HTTP)). Similarly, the instructions 602 may be transmitted or received using a transmission medium via the coupling 628 (e.g., a peer-to-peer coupling) to the devices 626. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 602 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methodologies disclosed herein may be performed by one or more processors. The performance of certain of the operations may be distributed among the one or more processors, not only residing within a single machine, but also deployed across a number of machines. In some examples, the processor or processors may be located in a single location (e.g., within a home environment, an office environment, or a server farm), while in other examples the processors may be distributed across a number of locations.

Although the examples of the present disclosure have been described with reference to specific examples, it will be evident that various modifications and changes may be made to these examples without departing from the broader scope of the inventive subject matter. Accordingly, the specification and drawings are to be regarded in an illustrative rather than a restrictive sense. The accompanying drawings that form a part hereof show, by way of illustration, and not of limitation, specific examples in which the subject matter may be practiced. The examples illustrated are described in sufficient detail to enable those skilled in the art to practice the teachings disclosed herein. Other examples may be used and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

Such examples of the inventive subject matter may be referred to herein, individually and/or collectively, by the term "example" merely for convenience and without intending to voluntarily limit the scope of this application to any single invention or inventive concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A data platform comprising:
at least one processor; and
at least one memory storing instructions that, when executed by the at least one processor, cause the at least one processor to perform operations comprising:
detecting a command within a database query to instantiate an application as a database object of the data platform; and
in response to detecting the command, executing a stored procedure, the stored procedure including instructions that when executed by the at least one processor, cause the at least one processor to perform operations comprising:
instantiating a User Defined Function (UDF) server within a context of the data platform based on a policy determined by an owner of the data object;
instantiating an application engine of the UDF server;
instantiating an application of the application engine; and
communicating by the application with a client using the application engine as a proxy server.

2. The data platform of claim 1, wherein the instructions included in the stored procedure comprise instructions for the application engine.

3. The data platform of claim 1, wherein the client comprises an application runtime component for communicating with the application.

4. The data platform of claim 1, wherein the policy comprises a security manager policy.

5. The data platform of claim 4, wherein the instructions that cause the at least one processor to perform operations of instantiating the UDF server further cause the at least one processor to perform operations comprising:
verifying, by a security manager, the UDF server based on the security manager policy.

6. The data platform of claim 1, wherein the instructions that cause the at least one processor to perform operations of instantiating the UDF server further cause the at least one processor to perform operations comprising:
assigning a Uniform Resource Locator (URL) identification to the UDF server that is stable across replications of the UDF server.

7. The data platform of claim 1, wherein the instructions that cause the at least one processor to perform operations of communicating with the client further cause the at least one processor to perform operations comprising:
using a communication channel that provides a set of commands that are used for interactions by the client with the UDF server.

8. The data platform of claim 1, wherein instructions of the application are defined by a third party that is not an owner of the application engine.

9. The data platform of claim 1, wherein the instructions that cause the at least one processor to perform operations of communicating with the client further cause the at least one processor to perform operations comprising:
receiving a request from the client for access to the data object; and
verifying, by a sandbox process, the access to the data object based on a sandbox policy.

10. The data platform of claim 1, wherein the instructions that cause the at least one processor to perform operations of instantiating the UDF server further cause the at least one processor to perform operations comprising:
setting HTTP response security policies based on permissions defined in a security policy.

11. A computer-implemented method comprising:
detecting, by at least one processor, a command within a database query to instantiate an application as a database object of a data platform; and
in response to detecting the command, executing a stored procedure, the stored procedure including instructions that when executed by the at least one processor, cause the at least one processor to perform operations comprising:
instantiating a UDF server within a context of the data platform based on a policy determined by an owner of the data object;
instantiating an application engine of the UDF server;
instantiating an application of the application engine; and
communicating with a client using the application engine as a proxy server.

12. The computer-implemented method of claim 11, wherein the instructions included in the stored procedure comprise instructions for the application engine.

13. The computer-implemented method of claim 11, wherein the client comprises an application runtime component for communicating with the application.

14. The computer-implemented method of claim 11, wherein the policy comprises a security manager policy.

15. The computer-implemented method of claim 14, wherein instantiating the UDF server within the context of the data platform further comprises:
verifying, by a security manager, the UDF server based on the security manager policy.

16. The computer-implemented method of claim 11, wherein instantiating the UDF server further comprises:
assigning a Uniform Resource Locator (URL) identification to the UDF server that is stable across replications of the UDF server.

17. The computer-implemented of claim 11, wherein communicating with the client using the application engine as a proxy server further comprises:
using a communication channel that provides a set of commands that are used for interactions by the client with the UDF server.

18. The computer-implemented of claim 11, wherein instructions of the application are defined by a third party that is not an owner of the application engine.

19. The computer-implemented method of claim 11, wherein the instructions that cause the at least one processor to perform operations of communicating with the client, further cause the at least one processor to perform operations comprising:
receiving a request from the client for access to the data object; and
verifying, by a sandbox process, the access to the data object based on a sandbox policy.

20. The computer-implemented method of claim 11, wherein instantiating the UDF server further comprises:
setting HTTP response security policies based on permissions defined in a security policy.

21. A computer-storage medium comprising instructions that, when executed by at least one processor of a computer, cause the computer to perform operations comprising:
detecting a command within a database query to instantiate an application as a database object of a data platform; and
in response to detecting the command, executing a stored procedure, the stored procedure including instructions that, when executed by the at least one processor, cause the computer to perform operations comprising:

instantiating a UDF server within a context of the data platform based on a policy determined by an owner of the data object;

instantiating an application engine of the UDF server;

instantiating an application of the application engine; and communicating with a client using the application engine as a proxy server.

22. The computer-storage medium of claim 21, wherein the instructions included in the stored procedure comprise instructions for the application engine.

23. The computer-storage medium of claim 21, wherein the client comprises an application runtime component for communicating with the application.

24. The computer-storage medium of claim 21, wherein the policy comprises a security manager policy.

25. The computer-storage medium of claim 24, wherein the instructions that cause the computer to perform operations of instantiating a UDF server within a security context of the data platform further cause the computer to perform operations comprising:

verifying, by a security manager, the UDF server based on the security manager policy.

26. The computer-storage medium of claim 21, wherein the instructions that cause the computer to perform operations of instantiating a UDF server further cause the computer to perform operations comprising:

assigning a Uniform Resource Locator (URL) identification to the UDF server that is stable across replications of the UDF server.

27. The computer-storage medium of claim 21, wherein the instructions that cause computer to perform operations of communicating with the client further cause the computer to perform operations comprising:

using a communication channel that provides a set of commands that are used for interactions by the client with the UDF server.

28. The computer-storage medium of claim 21, wherein instructions of the application are defined by a third party that is not an owner of the application engine.

29. The computer-storage medium of claim 21, wherein the instructions that cause the computer to perform operations of communicating with the client further cause the computer to perform operations comprising:

receiving a request from the client for access to the data object; and verifying, by a sandbox process, the access to the data object based on a sandbox policy.

30. The computer-storage medium of claim 21, wherein the instructions that cause the computer to perform operations of instantiating the UDF server further cause the computer to perform operations comprising:

setting HTTP response security policies based on permissions defined in a security policy.

\* \* \* \* \*